US012730441B2

(12) United States Patent
Choi et al.

(10) Patent No.: US 12,730,441 B2
(45) Date of Patent: Sep. 8, 2026

(54) AUTONOMOUS VEHICLE, CONTROL SYSTEM FOR REMOTELY CONTROLLING THE SAME, AND METHOD THEREOF

(71) Applicants: Hyundai Motor Company, Seoul (KR); Kia Corporation, Seoul (KR)

(72) Inventors: Jung Eun Choi, Seoul (KR); Jae Pil Hwang, Seoul (KR); Wan Jae Lee, Suwon-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 1203 days.

(21) Appl. No.: 17/545,907

(22) Filed: Dec. 8, 2021

(65) Prior Publication Data

US 2022/0413484 A1 Dec. 29, 2022

(30) Foreign Application Priority Data

Jun. 25, 2021 (KR) ........................ 10-2021-0083400

(51) Int. Cl.
*G05D 1/00* (2024.01)
*B60W 50/029* (2012.01)
(Continued)

(52) U.S. Cl.
CPC ......... *G05D 1/0011* (2013.01); *B60W 50/029* (2013.01); *B60W 50/14* (2013.01);
(Continued)

(58) Field of Classification Search
CPC .. G05D 1/0011; G05D 1/0214; G05D 1/0223; B60W 50/029; B60W 50/14; B60W 60/001; B60W 2050/146; B60W 2520/04; B60W 2556/45; B60W 2030/082; B60W 2556/65; B60W 60/0018; B60W 2050/0292; B60W 60/00186;
(Continued)

(56) References Cited

U.S. PATENT DOCUMENTS 9,494,935 B2 11/2016 Okumura et al.
10,317,899 B2 6/2019 Liu et al.
10,789,787 B2 9/2020 Stefan et al.
2018/0356814 A1* 12/2018 Brooks .................... G05D 1/87
(Continued)

FOREIGN PATENT DOCUMENTS

JP 2021-021980 A 2/2021
KR 101747375 B1 6/2017
(Continued)

*Primary Examiner* — Thomas E Worden
*Assistant Examiner* — Madison B Emmett
(74) *Attorney, Agent, or Firm* — MORGAN, LEWIS & BOCKIUS LLP

(57) ABSTRACT

An autonomous vehicle, a control system for remotely controlling the same, and a method thereof may include an autonomous driving control apparatus including a processor for determining whether remote control of the autonomous vehicle is required according to at least one of occurrence of failure of the vehicle during autonomous driving thereof, occurrence of an accident, a region where the autonomous driving is not possible, reliability of positioning data of the vehicle, a stopping time of the vehicle, or a response point of a hand signal, and for requesting the remote control to a control system when the remote control of the vehicle is required.

13 Claims, 8 Drawing Sheets

(51) Int. Cl.

| | |
|---|---|
| ***B60W 50/14*** | (2020.01) |
| ***B60W 60/00*** | (2020.01) |
| ***G08G 1/0967*** | (2006.01) |

(52) U.S. Cl.
CPC ..... *B60W 60/001* (2020.02); *G08G 1/096725* (2013.01); *B60W 2050/146* (2013.01); *B60W 2520/04* (2013.01); *B60W 2556/45* (2020.02)

(58) Field of Classification Search
CPC ........... B60W 60/007; B60W 50/0205; B60W 30/18054; B60W 40/105; B60W 2050/0064; B60W 2050/143; B60W 2520/10; G08G 1/096725; G08G 1/164; G08G 1/165; G08G 1/167; B60K 35/00; B60K 35/22; B60K 35/28
See application file for complete search history.

(56) References Cited

U.S. PATENT DOCUMENTS

| | | | | |
|---|---|---|---|---|
| 2018/0364704 | A1* | 12/2018 | Liu | G05D 1/0088 |
| 2021/0016797 | A1 | 1/2021 | Yokota et al. | |
| 2021/0026351 | A1 | 1/2021 | Tatsumoto et al. | |
| 2021/0039672 | A1* | 2/2021 | Tokuda | B60W 50/14 |
| 2021/0183186 | A1* | 6/2021 | Patnaik | G01G 19/02 |

FOREIGN PATENT DOCUMENTS

| | | | |
|---|---|---|---|
| KR | 1020190057881 | A | 5/2019 |
| KR | 102061750 | B1 | 1/2020 |
| KR | 1020200023674 | A | 3/2020 |
| KR | 10-2112684 | B | 6/2020 |
| KR | 10-2177826 | B | 11/2020 |
| WO | WO2019/010128 | A1 | 1/2019 |

* cited by examiner

AUTONOMOUS VEHICLE, CONTROL SYSTEM FOR REMOTELY CONTROLLING THE SAME, AND METHOD THEREOF

CROSS-REFERENCE TO RELATED APPLICATION

The present application claims priority to Korean Patent Application No. 10-2021-0083400, filed on Jun. 25, 2021, the entire contents of which is incorporated herein for all purposes by this reference.

BACKGROUND OF THE INVENTION

Field of the Invention

The present invention relates to an autonomous vehicle, a control system for remotely controlling the same, and a method thereof, and more particularly, to a technique for determining a situation requiring remote control of an autonomous vehicle.

Description of Related Art

As an electronic technique of a vehicle develops, an interest in an autonomous vehicle that drives to a destination by recognizing a driving environment of the vehicle itself without manipulation of a driver is growing more and more.

An autonomous vehicle refers to a vehicle capable of operating by itself without manipulation of a driver or a passenger.

While driving in an autonomous driving mode, there may be a situation in which it is impossible to follow a driving path to the destination normally although there is no abnormality in a function of the vehicle. As such, when a situation where it is impossible to follow a path occurs during autonomous driving, it is often difficult to follow the driving path, such as when the driver directly intervenes in control of the vehicle or when the driver's intervention is difficult, the vehicle stops.

The information disclosed in this Background of the Invention section is only for enhancement of understanding of the general background of the invention and may not be taken as an acknowledgement or any form of suggestion that this information forms the related art already known to a person skilled in the art.

BRIEF SUMMARY

Various aspects of the present invention are directed to providing an autonomous vehicle, a control system for remotely controlling the same, and a method thereof, configured for determining whether remote control of the autonomous vehicle is required based on a situation inside or outside the vehicle during autonomous driving of the autonomous vehicle, and allowing autonomous driving to smoothly continue by requesting remote control to the control system.

The technical objects of the present invention are not limited to the objects mentioned above, and other technical objects not mentioned may be clearly understood by those skilled in the art from the description of the claims.

Various aspects of the present invention are directed to providing an autonomous vehicle, including: an autonomous driving control apparatus including a processor for determining whether remote control of the autonomous vehicle is required according to at least one of occurrence of failure of the vehicle during autonomous driving thereof, occurrence of an accident, a region where the autonomous driving is not possible, reliability of positioning data of the vehicle, a stopping time of the vehicle, or a response point of a hand signal, and for requesting the remote control to a control system when the remote control of the vehicle is required.

In various exemplary embodiments of the present invention, the processor may determine that the remote control of the vehicle is required when the reliability of current position information of the vehicle is low.

In various exemplary embodiments of the present invention, the processor may determine that the remote control of the vehicle is required when the vehicle is stopped for a predetermined time period or longer than the predetermined time period in a state where a current speed of the vehicle is 0 kph.

In various exemplary embodiments of the present invention, the processor may determine that the remote control of the vehicle is required when the vehicle needs to respond to the hand signal.

In various exemplary embodiments of the present invention, the processor may control the vehicle to move to a vehicle repair shop when the vehicle fails or the accident occurs.

In various exemplary embodiments of the present invention, the processor may determine whether the remote control of the autonomous vehicle is required according to information which is detected by an in-vehicle sensing device or information which is received from another vehicle or a traffic center.

In various exemplary embodiments of the present invention, the autonomous driving control apparatus may further include a communication device configured for performing V2X communication with the other vehicle or the traffic center.

In various exemplary embodiments of the present invention, the processor, when receiving a remote control start notification signal from the control system, may convert an autonomous driving mode into a remote control mode of the vehicle.

In various exemplary embodiments of the present invention, the processor may notify a driver of the conversion of the autonomous driving mode to the remote control mode.

In various exemplary embodiments of the present invention, the processor may further include a display device configured for outputting a notification screen when converting the autonomous driving mode to the remote control mode.

Various aspects of the present invention are directed to providing a control system including: a display device configured to display a remote control request screen from an autonomous vehicle; and a remote control apparatus configured to include a processor, upon receiving a remote control request from the autonomous vehicle of the vehicle control, for performing remote control of the vehicle according to vehicle data received from the autonomous vehicle, and for transmitting a remote control start notification signal to the autonomous vehicle.

In various exemplary embodiments of the present invention, the processor may display map information including a current path of the vehicle requesting the remote control and a remote control status table on the display device.

In various exemplary embodiments of the present invention, the processor may display a pop-up window for notifying the remote control request on the remote control request screen.

In various exemplary embodiments of the present invention, the pop-up window for notifying the remote control request may display ID information of the vehicle requesting the remote control.

In various exemplary embodiments of the present invention, the remote control status table may include at least one of IDs, vehicle models, driving states, autonomous driving states, driving speeds, autonomous driving distances, or network states of vehicles requesting remote control.

In various exemplary embodiments of the present invention, the processor may display the remote control status table with color or text thickness of an ID of the vehicle being remotely controlled separately from vehicles not being remotely controlled.

Various aspects of the present invention are directed to providing a remote control method including: determining whether remote control of the autonomous vehicle is required according to at least one of occurrence of failure of the vehicle during autonomous driving thereof, occurrence of an accident, a region where the autonomous driving is not possible, reliability of positioning data of the vehicle, a stopping time of the vehicle, or a response point of a hand signal; and requesting the remote control to a control system when the remote control of the vehicle is required.

In various exemplary embodiments of the present invention, the determining whether the remote control of the autonomous vehicle is required may include determining that the remote control of the vehicle is required when the reliability of current position information of the vehicle is low.

In various exemplary embodiments of the present invention, the determining whether the remote control of the autonomous vehicle is required may include determining that the remote control of the vehicle is required when the vehicle is stopped for a predetermined time period or longer than the predetermined time period in a state where a current speed of the vehicle is 0 kph.

In various exemplary embodiments of the present invention, the determining whether the remote control of the autonomous vehicle is required may include determining that the remote control of the vehicle is required when the vehicle needs to respond to the hand signal.

According to the present technique, it is possible to determine whether remote control of the autonomous vehicle is required based on a situation inside or outside the vehicle during autonomous driving of the autonomous vehicle, and to allow autonomous driving to smoothly continue by requesting remote control to the control system.

Furthermore, various effects which may be directly or indirectly identified through the present specification may be provided.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
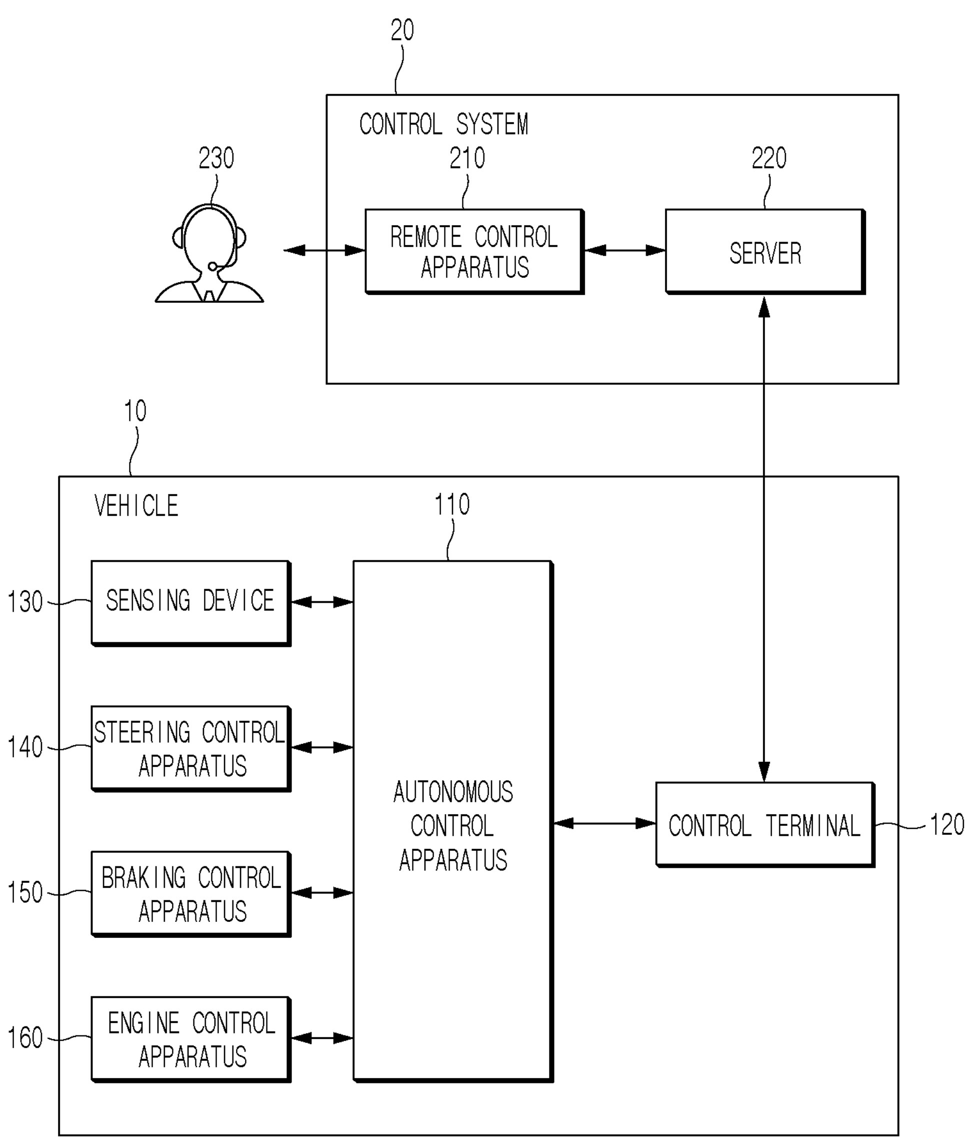
FIG. 1 illustrates a block diagram showing a configuration of a remote control system for an autonomous apparatus according to various exemplary embodiments of the present invention.

It may be understood that the appended drawings are not necessarily to scale, presenting a somewhat simplified representation of various features illustrative of the basic principles of the present invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, some exemplary embodiments of the present invention will be described in detail with reference to exemplary drawings. It should be noted that in adding reference numerals to constituent elements of each drawing, the same constituent elements have the same reference numerals as possible even though they are indicated on different drawings. Furthermore, in describing exemplary embodiments of the present invention, when it is determined that detailed descriptions of related well-known configurations or functions interfere with understanding of the exemplary embodiments of the present invention, the detailed descriptions thereof will be omitted.

In describing constituent elements according to various exemplary embodiments of the present invention, terms such as first, second, A, B, (a), and (b) may be used. These terms are only for distinguishing the constituent elements from other constituent elements, and the nature, sequences, or orders of the constituent elements are not limited by the terms. Furthermore, all terms used herein including technical scientific terms have the same meanings as those which are generally understood by those skilled in the technical field to which various exemplary embodiments of the present invention pertains (those skilled in the art) unless they are differently defined. Terms defined in a generally used dictionary shall be construed to have meanings matching those in the context of a related art, and shall not be construed to have idealized or excessively formal meanings unless they are clearly defined in the present specification.

Hereinafter, various exemplary embodiments of the present invention will be described in detail with reference to FIG. 1 to FIG. 8.

Figure 2:
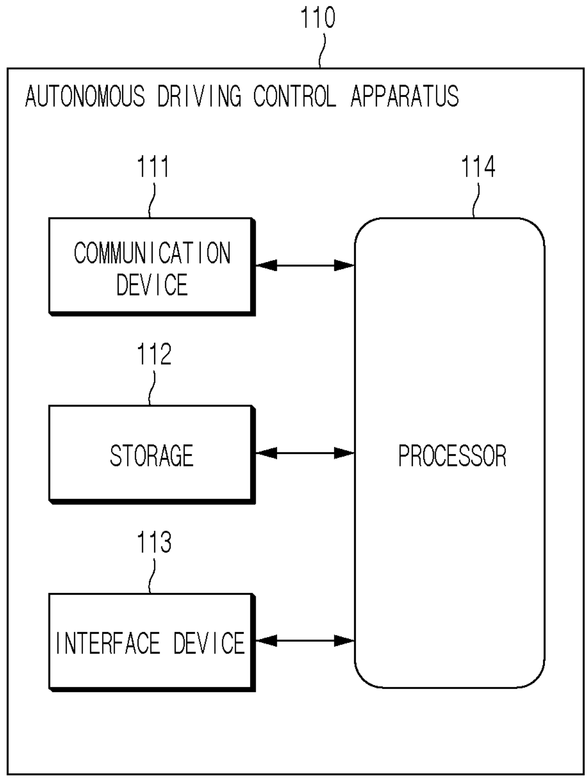
FIG. 2 illustrates a detailed schematic diagram of an autonomous driving control apparatus according to various exemplary embodiments of the present invention.
Figure 3:
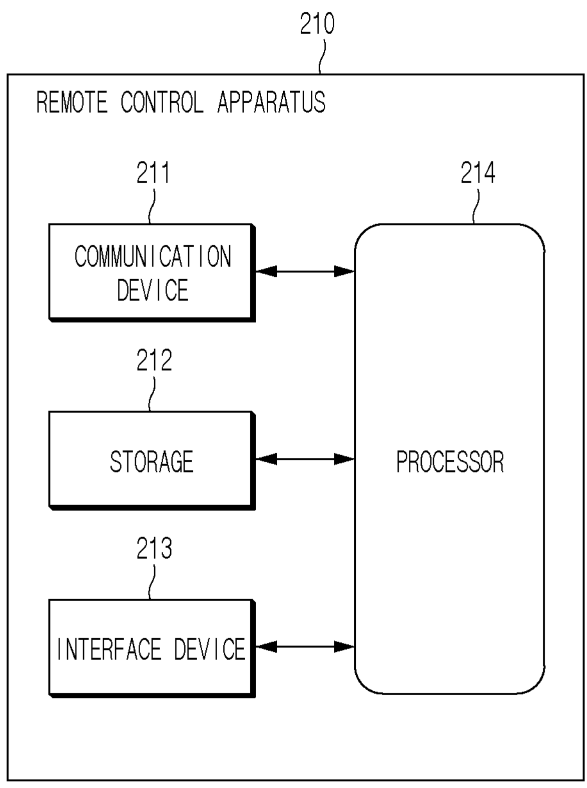
FIG. 3 illustrates a detailed schematic diagram of a remote control apparatus according to various exemplary embodiments of the present invention.

FIG. 1 illustrates a block diagram showing a configuration of a remote control system for an autonomous apparatus according to various exemplary embodiments of the present invention, FIG. 2 illustrates a detailed schematic diagram of an autonomous driving control apparatus according to various exemplary embodiments of the present invention, and FIG. 3 illustrates a detailed schematic diagram of a remote control apparatus according to various exemplary embodiments of the present invention.

Referring to FIG. 1, the remote control system for an autonomous vehicle according to various exemplary embodiments of the present invention includes a vehicle 10 and a control system 20, and remote control may be performed through communication between the vehicle 10 and the control system 20. In the instant case, the vehicle 10 may include an autonomous vehicle.

The autonomous vehicle 10 may include an autonomous driving control apparatus 110, a control terminal 120, a sensing device 130, a steering control apparatus 140, a braking control apparatus 150, and an engine control apparatus 160.

The autonomous driving control apparatus 110 according to the exemplary embodiment of the present invention may be implemented inside the vehicle. In the instant case, the autonomous driving control apparatus 110 may be integrally formed with internal control units of the vehicle, or may be implemented as a separate device to be connected to control units of the vehicle by a separate connection means.

The autonomous driving control apparatus 110 may determine whether remote control of the autonomous vehicle is required based on at least one of occurrence of failure of a vehicle driving in an autonomous driving mode, occurrence of an accident, a region where the autonomous driving is not possible, reliability of positioning data of the vehicle, a stopping time of the vehicle, or a response point of a hand signal.

When remote control of the autonomous vehicle 10 is required, the autonomous driving control apparatus 110 may request remote control to the control system 20, and may transmit vehicle data. Accordingly, when receiving a remote control start notification signal from the control system 20, the autonomous driving control apparatus 110 may switch an autonomous driving mode to a remote control mode, and may continue to control driving.

Referring to FIG. 1, the autonomous driving control apparatus 110 may include a communication device 111, a storage 112, an interface unit 113, and a processor 114.

The communication device 111 is a hardware device implemented with various electronic circuits to transmit and receive signals through a wireless or wired connection, and may transmit and receive information based on in-vehicle devices and in-vehicle network communication techniques. As an example, the in-vehicle network communication techniques may include controller area network (CAN) communication, Local Interconnect Network (LIN) communication, flex-ray communication, Ethernet communication, and the like.

Furthermore, the communication device 111 may perform communication by use of a server (e.g., a traffic center), infrastructure, or third vehicles outside the vehicle, and the like through a wireless Internet access or short range communication technique. Herein, the wireless communication technique may include wireless LAN (WLAN), wireless broadband (Wibro), Wi-Fi, Worldwide Interoperability for Microwave Access (WiMAX), etc. Furthermore, short-range communication technique may include Bluetooth, ZigBee, ultra wideband (UWB), radio frequency identification (RFID), infrared data association (IrDA), and the like.

The communication device 111 may perform vehicle-to-everything (V2X) communication. The V2X communication may include communication between vehicle and all entities such as Vehicle-to-vehicle (V2V) communication which refers to communication between vehicles, Vehicle to Infrastructure (V2I) communication which refers to communication between a vehicle and an eNB or road side unit (RSU), Vehicle-to-pedestrian (V2P) communication, which refers to communication between user equipment (UE) held by vehicles and individuals (pedestrians, cyclists, vehicle drivers, or passengers), and Vehicle-to-network (V2N) communication.

For example, the communication device 111 may receive traffic accident information, road construction information, and the like from other vehicles, traffic centers, and infrastructure around roads to provide them to the processor 114.

The storage 112 may store data and/or algorithms required for the processor 114 to operate, and the like. As an example, the storage 112 may store a sensing result of the sensing device 130 in the vehicle and the information received by the communication device 111 from other vehicles, traffic centers, and infrastructure around roads.

The storage 112 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The interface device 113 may include an input means for receiving a control command from a user and an output means for outputting an operation state of the apparatus 110 and results thereof. Herein, the input means may include a key button, and may further include a mouse, a keyboard, a touch screen, a microphone, a joystick, a jog shuttle, a stylus pen, and the like. Furthermore, the input means may further include a soft key implemented on the display.

The interface device 113 may be implemented as a head-up display (HUD), a cluster, an audio video navigation (AVN), a human machine interface (HM), a user setting menu (USM), or the like.

For example, the interface device 113 may display data (e.g., a remote control start notification signal, a remote control command, a driving path of the vehicle, etc.) transmitted and received with respect to the control system 20. Furthermore, the interface device 113 may display a notification screen when switching between an autonomous driving mode and a remote control mode.

The output means may include a display, and may further include a voice output means such as a speaker. In the instant case, when a touch sensor formed of a touch film, a touch sheet, or a touch pad is provided on the display, the display may operate as a touch screen, and may be implemented in a form in which an input device and an output device are integrated.

In the instant case, the display may include at least one of a liquid crystal display (LCD), a thin film transistor liquid crystal display (TFT LCD), an organic light emitting diode display (OLED display), a flexible display, a field emission display (FED), or a 3D display.

The processor 114 may be electrically connected to the communication device 111, the storage 112, the interface device 113, and the like, may electrically control each component, and may be an electrical circuit that executes software commands, performing various data processing and determinations described below.

The processor 114 may process a signal transferred between components of the autonomous driving control apparatus 110, and may perform overall control such that each of the components can perform its function normally.

The processor 114 may be implemented in a form of hardware, software, or a combination of hardware and software, or may be implemented as microprocessor, and may be, e.g., an electronic control unit (ECU), a micro controller unit (MCU), or other subcontrollers mounted in the vehicle.

The processor 114 may determine whether remote control of the autonomous vehicle is required according to at least one of occurrence of failure of the vehicle during autonomous driving thereof, occurrence of an accident, a region where the autonomous driving is not possible, reliability of positioning data of the vehicle, a stopping time of the vehicle, or a response point of a hand signal. In the instant case, the region where autonomous driving is not possible may include a child protection zone.

When reliability of current position information of the vehicle 10 is low, the processor 114 may determine that the remote control of the vehicle 10 is required. Furthermore, the processor 114 may determine that the remote control of the vehicle 10 is required when the vehicle 10 is stopped for a predetermined time period or longer than the predetermined time period in a state where a current speed is 0 kph. Furthermore, the processor 114 may determine that the remote control of the vehicle 10 is required when the vehicle needs to respond to the hand signal.

The processor 114 may determine whether remote control of the autonomous vehicle is required based on information detected by the in-vehicle sensing device 130 or information received from another vehicle or a traffic center.

When a failure of the vehicle 10 occurs or an accident occurs, the processor 114 may control the vehicle 10 to move to a vehicle repair shop, and may perform control to receive an additional vehicle. For example, the processor 114 may control movement to a specific point where a vehicle may be replaced when another vehicle is replaced with a broken vehicle.

When it is determined that the remote control is required, the processor 114 may request remote control to the control system 20, and may transmit vehicle data. In the instant case, the vehicle data may include at least one of image information around the vehicle, surrounding object information, a current position of the vehicle, a current path of the vehicle, speed information of the vehicle, indoor image information, or map information.

Upon receiving the remote control start notification signal from the control system 20, the processor 114 may convert the autonomous driving mode to the remote control mode, and may continue vehicle control depending on the remote control of the control system 20.

In the instant case, the processor 114 may notify a driver of conversion from the autonomous driving mode to the remote control mode through a text or an output sound. Furthermore, the processor 114 may guide the conversion to the remote control mode when receiving the remote control start notification signal from the control system 20. Furthermore, the processor 114 may inform that the mode may be switched to the remote control mode as soon as it is determined that the autonomous driving is impossible, that is, that the remote control is required.

The control terminal 120 may receive a remote control request signal, vehicle data, etc. from the autonomous driving control apparatus 110 to transmit it to the control system 20, and may receive a remote control start notification signal, etc. transmitted from the control system 20 to transmit it to the autonomous driving control apparatus 110. To the present end, the control terminal 120 may include a communication device such as a modem. Furthermore, the control terminal 120 may perform wireless communication with the control system 20 through a wireless communication technique. Herein, the wireless communication technique may include wireless LAN (WLAN), wireless broadband (Wibro), Wi-Fi, Worldwide Interoperability for Microwave Access (WiMAX), etc. For example, the control terminal 120 may receive a remote control command from the control system 20 to transmit it to the autonomous driving control apparatus 110.

The present invention includes an example in which the control terminal 120 separately mounted on the vehicle 10 performs communication with the control system 20, but the present invention is not limited thereto, and it may be implemented to communicate with the control system 20 through the communication device 111 of the autonomous driving control apparatus 110 without separately providing the control terminal 120.

The sensing device 130 may include one or more sensors that detect an obstacle positioned around the vehicle, an obstacle on a path, and the like, and measure a distance with the obstacle and/or a relative speed thereof.

The sensing device 130 may include a plurality of sensors to detect an external object of the vehicle, to obtain information related to a position of the external object, a speed of the external object, a moving direction of the external object, and/or a type of the external object (e.g., vehicles, pedestrians, bicycles or motorcycles, etc.). To the present end, the sensing device 130 may include an ultrasonic sensor, a radar, a camera, a laser scanner, and/or a corner radar, a Light Detection and Ranging (LiDAR), an acceleration sensor, a yaw rate sensor, a torque measurement sensor and/or a wheel speed sensor, a steering angle sensor, etc.

Furthermore, the sensing device 130 may collect implicit information related to a vehicle interior, and, to the present end, the sensing device 130 may include a vehicle indoor camera. For example, the implicit information may include a case in which a passenger leaves an object in the vehicle and gets off the vehicle.

The steering control device 140 may be configured to control a steering angle of a vehicle, and may include a steering wheel, an actuator interlocked with the steering wheel, and a controller configured for controlling the actuator.

The braking control device 150 may be configured to control braking of the vehicle, and may include a controller that is configured to control a brake thereof.

The engine control device 160 may be configured to control engine driving of a vehicle, and may include a controller that is configured to control a speed of the vehicle.

Meanwhile, the control system 20 includes a remote control apparatus 210 and a server 220.

When receiving a remote control request from the autonomous vehicle 10, the remote control apparatus 210 may perform remote control based on vehicle data received from the autonomous vehicle 10, and may transmit a remote control start notification signal to the autonomous vehicle 10.

The remote control apparatus 210 may generate a remote control command for remote control based on the vehicle data, may modify a current path of the vehicle 10, or may transmit a new path to the autonomous vehicle 10.

An operator 230 may check the remote control request of the autonomous vehicle 10 through a screen of the remote control apparatus 210, and may check a situation and a path in which autonomous driving of the autonomous vehicle 10 is impossible. In the instant case, the operator 230 is a person who is authorized to access the remote control apparatus 210, and may be disposed in a place that the access to the remote control apparatus 210 is possible, such as an office inside the vehicle or outside the vehicle.

Referring to FIG. 3, the remote control apparatus 210 may include a communication device 211, a storage 212, an interface device 213, and a processor 214.

The communication device 211 is a hardware device implemented with various electronic circuits to transmit and receive signals through a wireless or wired connection, and may transmit and receive information based on in-vehicle devices and in-vehicle network communication techniques.

The storage 212 may store data and/or algorithms required for the processor 214 to operate, and the like. As an example, the storage 212 may store a remote control status table, and the remote control status table may be updated in real time.

The storage 212 may include a storage medium of at least one type among memories of types such as a flash memory, a hard disk, a micro, a card (e.g., a secure digital (SD) card or an extreme digital (XD) card), a random access memory (RAM), a static RAM (SRAM), a read-only memory (ROM), a programmable ROM (PROM), an electrically erasable PROM (EEPROM), a magnetic memory (MRAM), a magnetic disk, and an optical disk.

The interface device 213 may include an input means for receiving a control command from a user and an output means for outputting an operation state of the apparatus 210 and results thereof. Herein, the input means may include a key button, and may further include a mouse, a keyboard, a touch screen, a microphone, a joystick, a jog shuttle, a stylus pen, and the like. Furthermore, the input means may further include a soft key implemented on the display.

The output means may include a display, and may further include a voice output means such as a speaker. In the instant case, when a touch sensor formed of a touch film, a touch sheet, or a touch pad is provided on the display, the display may operate as a touch screen, and may be implemented in a form in which an input device and an output device are integrated. In the instant case, the display may include at least one of a liquid crystal display (LCD), a thin film transistor liquid crystal display (TFT LCD), an organic light emitting diode display (OLED display), a flexible display, a field emission display (FED), or a 3D display.

For example, the interface device 213 may display map information in which data received from the vehicle 10, a driving path of the vehicle, a current position of the vehicle, information related to surrounding objects, and the like overlap. Furthermore, the interface device 213 may display a remote control request screen upon receiving the remote control request from the autonomous vehicle 10. The interface device 213 may display map information, a remote control status table, and the like, and specific details will be described later with reference to FIG. 6.

For example, the interface device may include all communication terminals such as a personal computer (PC), a notebook computer, a smartphone, a tablet PC, a pad, a personal digital assistant (PDA), and a wearable device.

The processor 214 may be electrically connected to the communication device 211, the storage 212, the interface device 213, and the like, may electrically control each component, and may be an electrical circuit that executes software commands, performing various data processing and determinations described below.

The processor 214 may process a signal transferred between components of the remote control apparatus 210, and may perform overall control such that each of the components can perform its function normally. The processor 214 may be implemented in a form of hardware, software, or a combination of hardware and software, or may be implemented as microprocessor.

Figure 6:
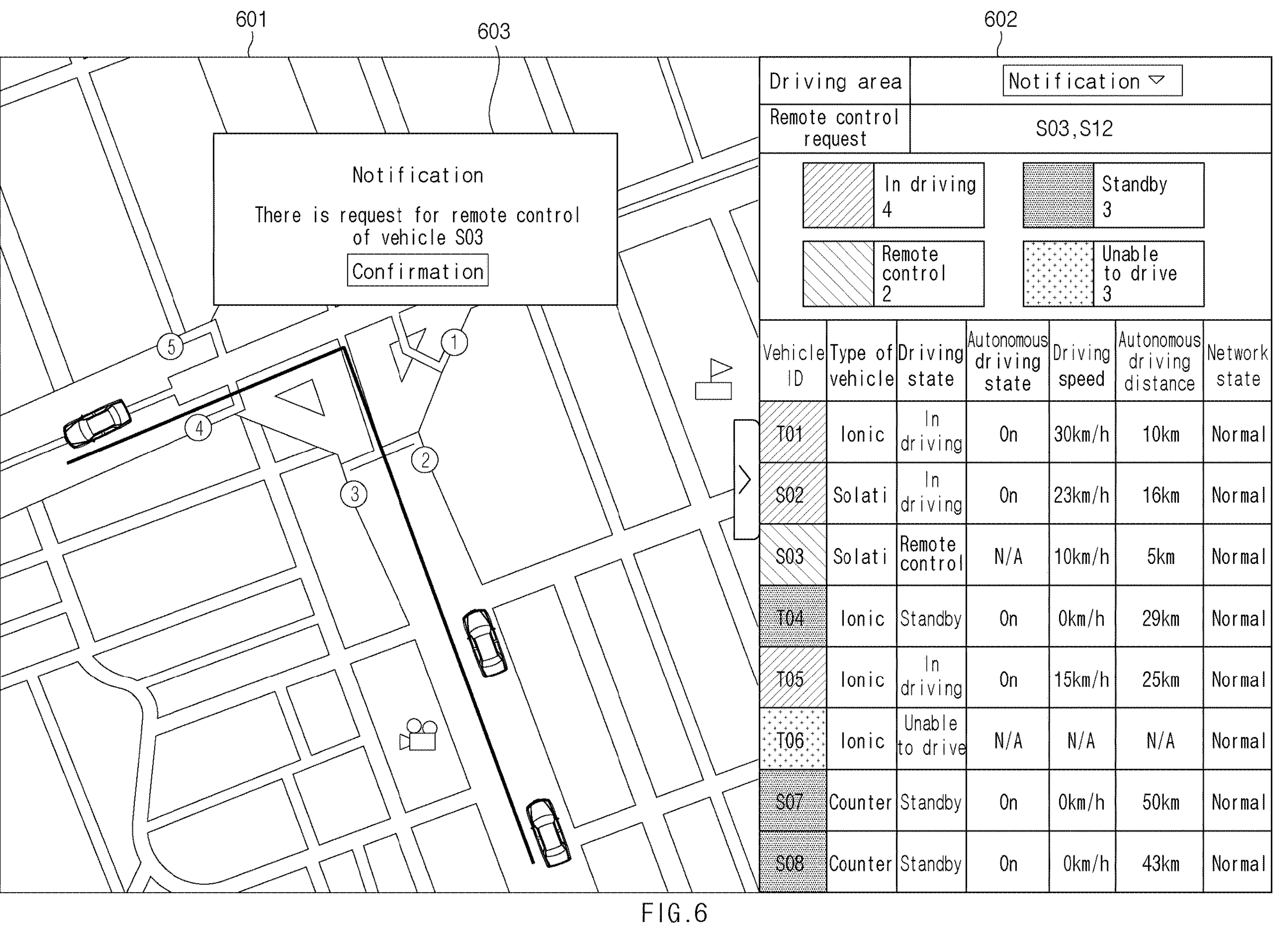
FIG. 6 illustrates an example of a screen for a remote control request of a remote control apparatus according to various exemplary embodiments of the present invention.

When receiving the remote control request from the autonomous vehicle 10, the processor 214 may configure a map 601 and a remote control status table 602 as illustrated in FIG. 6 to display it on the interface device 213 based on the vehicle data received from the autonomous vehicle 10. A current path of the autonomous vehicle 10 may be displayed on the map 601, and a remote control request text may be displayed on the map 601 in a form of a pop-up window 603. In the instant case, the pop-up window 603 may be displayed together with an ID of the vehicle requesting the remote control.

The remote control status table 602 may include at least one of at least one of IDs, vehicle models, driving states, autonomous driving states, driving speeds, autonomous driving distances, or network states of vehicles requesting remote control.

The processor 214 may control the remote control status table 602 with color or letter thickness of the ID of the vehicle being remotely controlled to be displayed separately from the vehicles not being remotely controlled. Furthermore, the processor 214 may flash the ID of the vehicle being remotely controlled in the remote control status table 602, or may perform highlight display such that the operator can see it at a glance.

The server 220 may perform relay between the remote control apparatus 210 and the vehicle 10, may store vehicle data received from the vehicle 10, and may store a remote control command received from the remote control apparatus 210, and the like.

The server 220 may perform wireless communication with the control terminal 120 of the vehicle 10 through a wireless communication technique. Herein, since the wireless communication technique is the same as that of the above-described control terminal 120, a detailed description thereof will be omitted.

The present invention includes an example in which the server 220 of the control system 20 communicates with the vehicle 10, but the present invention is not limited thereto, and it may be implemented to communicate with the vehicle 10 through the communication device 211 of the remote control apparatus 210 without configuring the server 220. Furthermore, the communication device 111 of the autonomous driving control apparatus 110 of the vehicle and the communication device 211 of the remote control apparatus 210 may directly communicate with each other.

Figure 4:
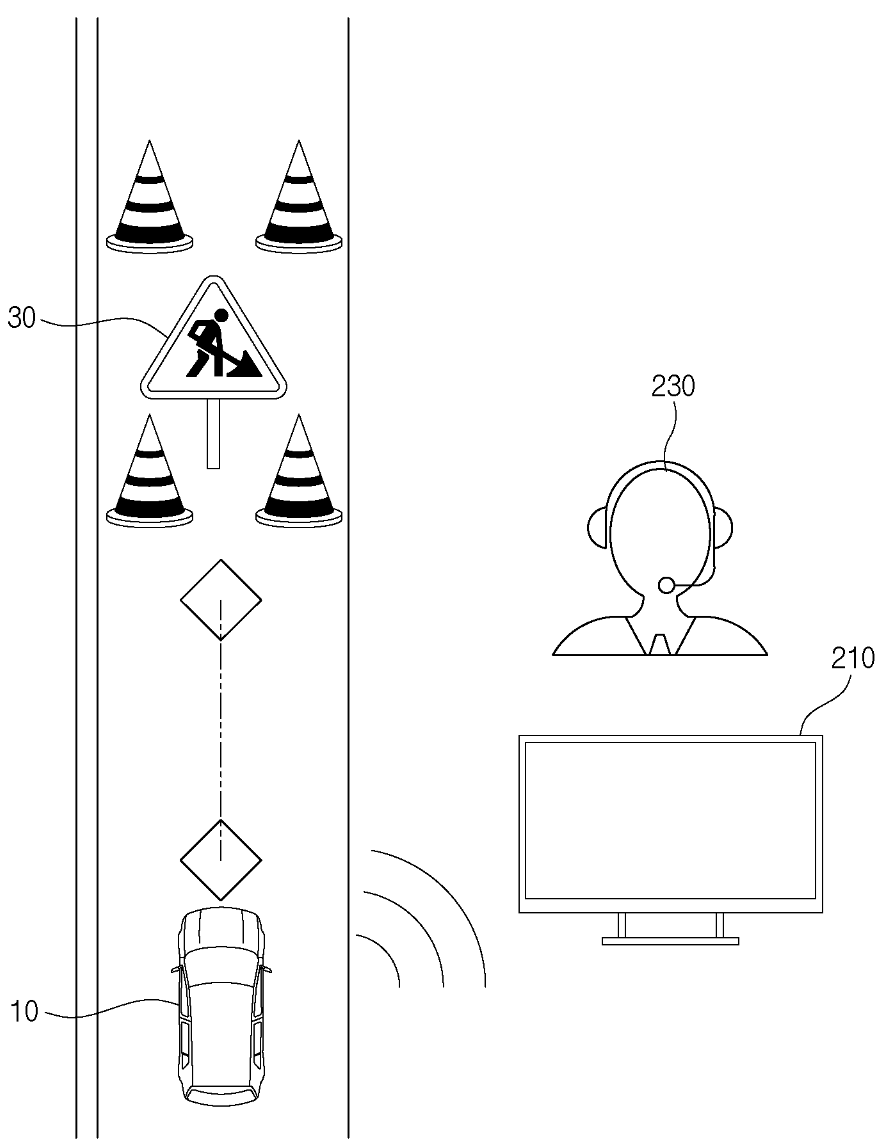
FIG. 4 illustrates a view for describing an example of a situation in which it is impossible to follow a path during autonomous driving according to various exemplary embodiments of the present invention.
Figure 5:
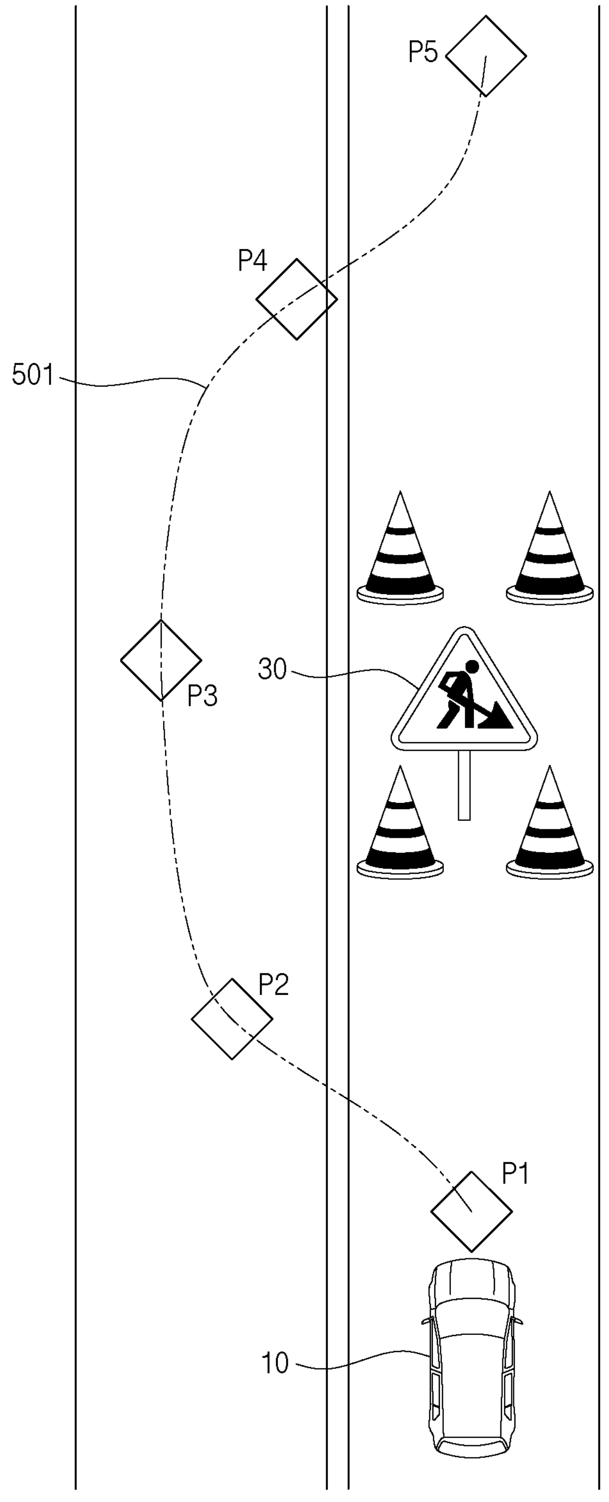
FIG. 5 illustrates a view for describing an example of adjusting a path depending on a remote control command of a remote control apparatus according to various exemplary embodiments of the present invention.

FIG. 4 illustrates a view for describing an example of a situation in which it is impossible to follow a path during autonomous driving according to various exemplary embodiments of the present invention, and FIG. 5 illustrates a view for describing an example of adjusting a path depending on a remote control command of a remote control apparatus according to various exemplary embodiments of the present invention.

Referring to FIG. 4, when road construction 30 occurs on the driving path of the autonomous vehicle 10 and a situation in which it is not possible to continue driving on the driving path occurs, the autonomous vehicle 10 determines that remote control is required.

Accordingly, the autonomous vehicle 10 transmits vehicle data to the control system 20, and the remote control apparatus 210 of the control system 20 displays a road on which the vehicle 10 is traveling, information related to surrounding objects, a position of the vehicle 10, and a driving path on a map.

Referring to FIG. 5, an operator 230 may adjust a path 501 by moving path points P1, P2, P3, P4, and P5, and the control system 20 may transmit adjusted path information to the vehicle 10.

FIG. 6 illustrates an example of a screen for a remote control request of a remote control apparatus 210 according to various exemplary embodiments of the present invention.

Referring to FIG. 6, when receiving a remote control request from the vehicle 10, the remote control apparatus 210 may configure a map 601 and a remote control status table 602 to display it on the interface device 213. A current path of the autonomous vehicle 10 may be displayed on the map 601, and a remote control request text may be displayed on the map 601 in a form of a pop-up window 603. In the instant case, the pop-up window 603 may be displayed together with an ID of the vehicle requesting the remote control.

Furthermore, the remote control status table 602 may include information such as a driving area, IDs of vehicles requested for remote control, a number of vehicles currently driven, a number of vehicles waiting for remote control, a number of vehicles under remote control, and a number of vehicles that are impossible to be driven.

Furthermore, the remote control status table 602 may include a vehicle type by vehicle ID, driving state, autonomous driving state, driving speed, autonomous driving distance, network state, and the like. In the instant case, the driving state may include a state in which autonomous driving is in progress, in remote control, in standby mode, and incapable of driving.

Figure 7:
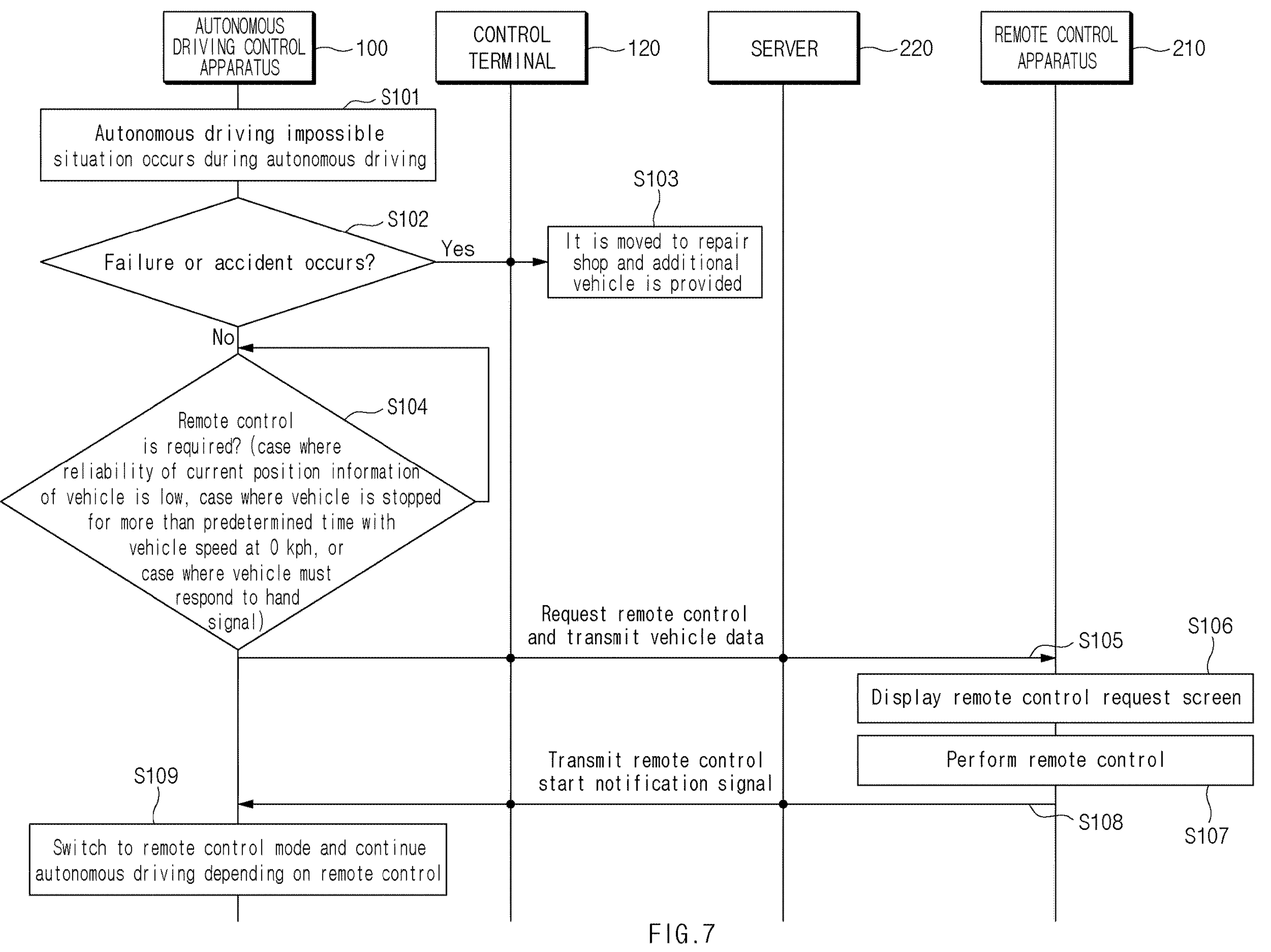
FIG. 7 illustrates a flowchart showing a remote control method for an autonomous vehicle according to various exemplary embodiments of the present invention.

Hereinafter, a remote control method for an autonomous vehicle according to various exemplary embodiments of the present invention will be described in detail with reference to FIG. 7. FIG. 7 illustrates an autonomous control method for a vehicle according to various exemplary embodiments of the present invention.

Hereinafter, it is assumed that the autonomous driving control apparatus 110 of the of FIG. 1 performs processes of FIG. 7. Furthermore, in the description of FIG. 7, it may be understood that operations referred to as being performed by each device are controlled by a processor of each of the devices. In FIG. 7, the autonomous driving control apparatus 110 of the vehicle 10 and the remote control apparatus 210 of the control system 20 may perform communication through a control terminal 1200 and a server 220, respectively.

Referring to FIG. 7, the autonomous driving control apparatus 110 determines whether an autonomous driving impossible situation occurs during autonomous driving (S101). In the instant case, the autonomous driving control apparatus 110 may collect surrounding information based on V2X communication from traffic centers, other vehicles, road infrastructure, etc., the surrounding information may be collected from the sensing device 130, and it may be determined whether the autonomous driving impossible situation occurs based on the surrounding information. In the instant case, the autonomous driving impossible situation may include road construction, vehicle failure, traffic accident, child protection zone, and the like.

When autonomous driving is impossible, the autonomous driving control apparatus 110 determines whether a failure or an accident has occurred (S102). That is, the autonomous driving control apparatus 110 determines whether autonomous driving-related components (e.g., sensors, controllers, etc.) fail, whether other components fail, road construction, and whether a traffic accident occurs.

In the case of a situation in which autonomous driving is impossible due to a failure or an accident, the autonomous driving control apparatus 110 may control the movement of the corresponding vehicle to a repair shop, and may respond by providing an additional vehicle (S103). For example, a driver of the autonomous vehicle 100 may substitute another vehicle at a repair shop or another center when the vehicle fails or has an accident.

Meanwhile, when the autonomous driving is not impossible due to a failure or an accident, the autonomous driving control apparatus 110 may determine whether remote control is necessary (S104). That is, the autonomous driving control apparatus 110 may determine whether remote control is necessary by use of information detected by the sensing device 130, an in-vehicle signal received based on in-vehicle network communication, etc.

The autonomous driving control apparatus 110 may determine that remote control of the autonomous vehicle is required in the case of at least one of a case where reliability of current position information of a vehicle is low, a case where the vehicle is stopped for more than a predetermined time period (e.g., 3 minutes) with the vehicle speed at 0 kph, or a case where the vehicle must respond to a hand signal.

In an exemplary embodiment of the present invention, the reliability of current position information of a vehicle is low when the reliability of current position information is lower than a predetermined value.

When it is determined that the remote control of the vehicle is required, the autonomous driving control apparatus 110 transmits vehicle data for remote control to the remote control apparatus 210 through the control terminal 120 and the server 220 (S105). Furthermore, when it is determined that the remote control is required, the autonomous driving control apparatus 110 may notify a driver that the remote control is required. For example, the autonomous driving control apparatus 110 may output a text and/or a sound indicating that a child protection zone exists 200 meters ahead or switch to remote control after 10 seconds.

The vehicle data transmitted when the autonomous driving control apparatus 110 requests remote control to the control system 20 may include image information around the vehicle, object information around the vehicle, position and speed information of the vehicle, indoor image information, and map information.

Accordingly, the remote control apparatus 210 may display the vehicle data received from the autonomous driving control apparatus 110 of the autonomous vehicle 10 which is a remote control target and a remote control request screen, to enable the operator 230 to check it (S106). That is, the remote control apparatus 210 may display a map corresponding to the vehicle and a traveling path on a screen based on a current position of the vehicle 10. In the instant case, the map may be a precision map including a static object. Furthermore, the remote control apparatus 210 may overlap and display a vehicle position and surrounding object information on the map. Furthermore, as illustrated in FIG. 5, a current traveling path of the vehicle may include a path polynomial and one or more equally spaced points P1, P2, P3, P4, and P5. Furthermore, as illustrated in FIG. 6, the remote control apparatus 210 displays map information, path information, remote control status, etc. on the screen so that the operator 230 can check it.

As such, the remote control apparatus 210 receives selection of a remote control command from the operator 230 or adjustment of the current path of the vehicle to perform remote control (S107), and transmits a remote control start notification signal to the autonomous driving control apparatus 110 (S108).

Accordingly, when receiving the remote control start notification signal from the remote control apparatus 210, the autonomous driving control apparatus 110 of the autonomous vehicle 10 may switch to the remote control mode and may continue driving depending on the remote control (S109).

As such, according to various exemplary embodiments of the present invention, the autonomous vehicle may determine a remote control request condition comprehensively based on situations inside and outside the vehicle while driving in autonomous driving mode, and when the remote control request condition is satisfied, may request remote control to the control system 20. As such, according to various exemplary embodiments of the present invention, the autonomous vehicle may detect a zone where it is difficult to drive in the autonomous driving mode in advance during autonomous driving, and may request remote control to the control system 20 to improve reliability of the autonomous driving system. When providing services such as passenger transportation and physical distribution transportation, the vehicle may provide a smooth autonomous driving service.

Figure 8:
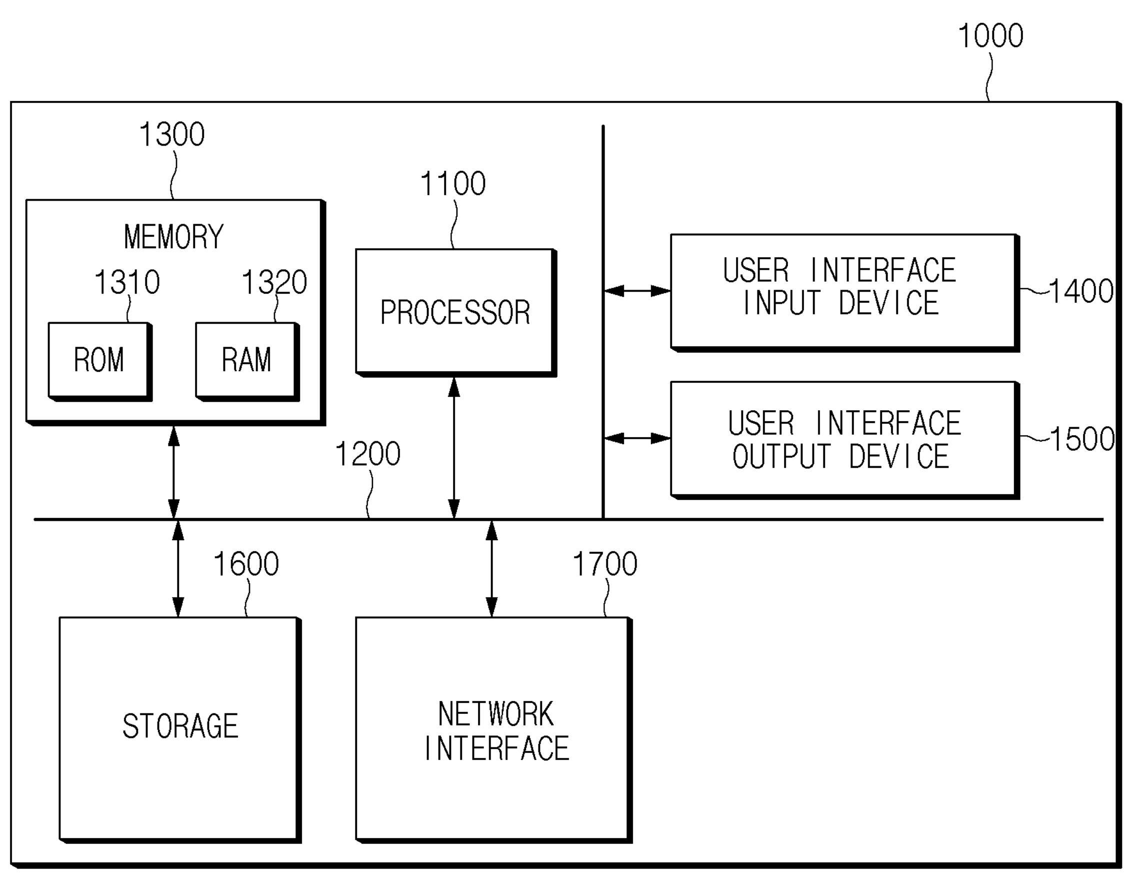
FIG. 8 illustrates a computing system according to various exemplary embodiments of the present invention.

FIG. 8 illustrates a computing system according to various exemplary embodiments of the present invention.

Referring to FIG. 8, the computing system 1000 includes at least one processor 1100 connected through a bus 1200, a memory 1300, a user interface input device 1400, a user interface output device 1500, and a storage 1600, and a network interface 1700.

The processor 1100 may be a central processing unit (CPU) or a semiconductor device that performs processing on commands stored in the memory 1300 and/or the storage 1600. The memory 1300 and the storage 1600 may include various types of volatile or nonvolatile storage media. For example, the memory 1300 may include a read only memory (ROM) 1310 and a random access memory (RAM) 1320.

Accordingly, steps of a method or algorithm described in connection with the exemplary embodiments included herein may be directly implemented by hardware, a software module, or a combination of the two, executed by the processor 1100. The software module may reside in a storage medium (i.e., the memory 1300 and/or the storage 1600) such as a RAM memory, a flash memory, a ROM memory, an EPROM memory, a EEPROM memory, a register, a hard disk, a removable disk, and a CD-ROM.

An exemplary storage medium is coupled to the processor 1100, which can read information from and write information to the storage medium. Alternatively, the storage medium may be integrated with the processor 1100. The processor and the storage medium may reside within an application specific integrated circuit (ASIC). The ASIC may reside within a user terminal. Alternatively, the processor and the storage medium may reside as separate components within the user terminal.

The above description is merely illustrative of the technical idea of the present invention, and those skilled in the art to which various exemplary embodiments of the present invention pertains may make various modifications and variations without departing from the essential characteristics of the present invention.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. An autonomous vehicle comprising:

an autonomous driving control apparatus including a processor configured for:

determining whether remote control of the autonomous vehicle is required according to at least one of occurrence of failure of the vehicle during autonomous driving of the vehicle, occurrence of an accident, a region where the autonomous driving is not possible, reliability of positioning data of the vehicle, a stopping time of the vehicle, or a response point of a hand signal, and requesting the remote control to a control system when the remote control of the vehicle is required, wherein the processor is configured to determine that the remote control of the vehicle is required when the vehicle is stopped for a predetermined time period or longer than the predetermined time period, and wherein the processor is configured to control the vehicle to move to a vehicle repair shop when the vehicle fails or the accident occurs, wherein the processor is configured to determine that the remote control of the vehicle is required when the vehicle needs to respond to the hand signal, wherein the processor, when receiving a remote control start notification signal from the control system, is configured to convert an autonomous driving mode into a remote control mode of the vehicle, wherein the processor is configured to notify a driver of the conversion of the autonomous driving mode to the remote control mode, and wherein the processor further includes to a display device configured for outputting a notification screen when converting the autonomous driving mode to the remote control mode.

2. The autonomous vehicle of claim 1, wherein the processor is configured to determine that the remote control of the vehicle is required when the reliability of current position information of the vehicle is low.

3. The autonomous vehicle of claim 1, wherein the processor is configured to determine whether the remote control of the autonomous vehicle is required according to information which is detected by an in-vehicle sensing device or information which is received from another vehicle or a traffic center.

4. The autonomous vehicle of claim 3, wherein the autonomous driving control apparatus further includes a communication device configured for performing vehicle-to- everything (V2X) communication with the other vehicle or the traffic center.

5. A control system comprising:

a display device configured to display a remote control request screen from an autonomous vehicle; and a remote control apparatus including a processor, upon receiving a remote control request from the autonomous vehicle, configured for performing remote control of the vehicle according to vehicle data received from the autonomous vehicle, and for transmitting a remote control start notification signal to the autonomous vehicle, wherein the processor is configured to determine that the remote control of the vehicle is required when the vehicle is stopped for a predetermined time period or longer than the predetermined time period, and wherein the processor is configured to control the vehicle to move to a vehicle repair shop when the vehicle fails or an accident occurs, wherein the processor is further configured to determine that the remote control of the vehicle is required when the vehicle needs to respond to a hand signal, wherein the processor, when receiving a remote control start notification signal from the control system, is configured to convert an autonomous driving mode into a remote control mode of the vehicle, wherein the processor is configured to notify a driver of the conversion of the autonomous driving mode to the remote control mode, and wherein the processor further includes a display device configured for outputting a notification screen when converting the autonomous driving mode to the remote control mode.

6. The control system of claim 5, wherein the processor is configured to display map information including a current path of the vehicle requesting the remote control and a remote control status table on the display device.

7. The control system of claim 6, wherein the remote control status table includes at least one of IDs, vehicle models, driving states, autonomous driving states, driving speeds, autonomous driving distances, or network states of vehicles requesting remote control.

8. The control system of claim 6, wherein the processor is configured to display the remote control status table with color or text thickness of an ID of the vehicle being remotely controlled separately from vehicles not being remotely controlled.

9. The control system of claim 5, wherein the processor is configured to display a pop-up window for notifying the remote control request on the remote control request screen.

10. The control system of claim 9, wherein the pop-up window for notifying the remote control request displays ID information of the vehicle requesting the remote control.

11. A remote control method for an autonomous vehicle, the method comprising:

determining whether remote control of the autonomous vehicle is required according to at least one of occurrence of failure of the vehicle during autonomous driving of the vehicle, occurrence of an accident, a region where the autonomous driving is not possible, reliability of positioning data of the vehicle, a stopping time of the vehicle, or a response point of a hand signal; and requesting the remote control to a control system when the remote control of the vehicle is required, wherein the remote control is determined to be required when the vehicle is stopped for a predetermined time period or longer than the predetermined time period, and wherein the vehicle is controlled to move to a vehicle repair shop when the vehicle fails or an accident occurs, wherein the determining whether the remote control of the autonomous vehicle is required includes:

determining that the remote control of the vehicle is required when the vehicle needs to respond to the hand signal, converting an autonomous driving mode of the vehicle into a remote control mode in response to the remote control start notification, notifying a driver of the conversion of the autonomous driving mode to the remote control mode, and outputting a notification screen via a display device, when converting the autonomous driving mode to the remote control mode.

12. The remote control method of claim 11, wherein the determining whether the remote control of the autonomous vehicle is required includes:

determining that the remote control of the vehicle is required when the reliability of current position information of the vehicle is low.

13. The remote control method of claim 11, wherein the determining whether the remote control of the autonomous vehicle is required includes:

determining that the remote control of the vehicle is required when the vehicle is stopped for the predetermined time period or longer than the predetermined time period in a state where a current speed of the vehicle is 0 kph.

* * * * *